(12) United States Patent
Floyd

(10) Patent No.: US 8,076,968 B1
(45) Date of Patent: Dec. 13, 2011

(54) LOW-INPUT-VOLTAGE CHARGE PUMP

(75) Inventor: Brian H. Floyd, Sunnyvale, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 103 days.

(21) Appl. No.: 12/400,659

(22) Filed: Mar. 9, 2009

(51) Int. Cl.
*G05F 1/10* (2006.01)

(52) U.S. Cl. ....................................................... 327/536

(58) Field of Classification Search .................. 327/536, 327/535, 537, 538, 540–543
See application file for complete search history.

(56) References Cited

U.S. PATENT DOCUMENTS

| | | | |
|---|---|---|---|
| 5,874,850 A | 2/1999 | Pulvirenti et al. | |
| 6,107,864 A | 8/2000 | Fukushima et al. | |
| 6,429,723 B1 | 8/2002 | Hastings | |
| 6,483,728 B1 | 11/2002 | Johnson et al. | |
| 6,501,325 B1 * | 12/2002 | Meng | 327/536 |
| 6,677,805 B2 * | 1/2004 | Shor et al. | 327/536 |
| 6,819,162 B2 * | 11/2004 | Pelliconi | 327/536 |
| 6,995,602 B2 | 2/2006 | Pelliconi | |
| 7,098,725 B2 * | 8/2006 | Lee | 327/536 |
| 7,145,382 B2 | 12/2006 | Ker et al. | |
| 7,208,996 B2 | 4/2007 | Suzuki et al. | |
| 7,427,891 B2 * | 9/2008 | Sakurai et al. | 327/536 |
| 7,595,683 B1 * | 9/2009 | Floyd | 327/536 |
| 7,683,699 B2 * | 3/2010 | Fort et al. | 327/536 |

* cited by examiner

*Primary Examiner* — Hai L Nguyen
(74) *Attorney, Agent, or Firm* — Sidley Austin LLP

(57) ABSTRACT

In an embodiment, a charge pump of relatively simple design is provided which can generate sufficient drive voltage for a power switching device from a low-supply-voltage (e.g., 1V). In some embodiments, this charge pump performs better at lower input voltages when there are loading conditions (i.e., when the charge-pump output powers other circuit blocks such as amplifiers and LDO's).

19 Claims, 9 Drawing Sheets

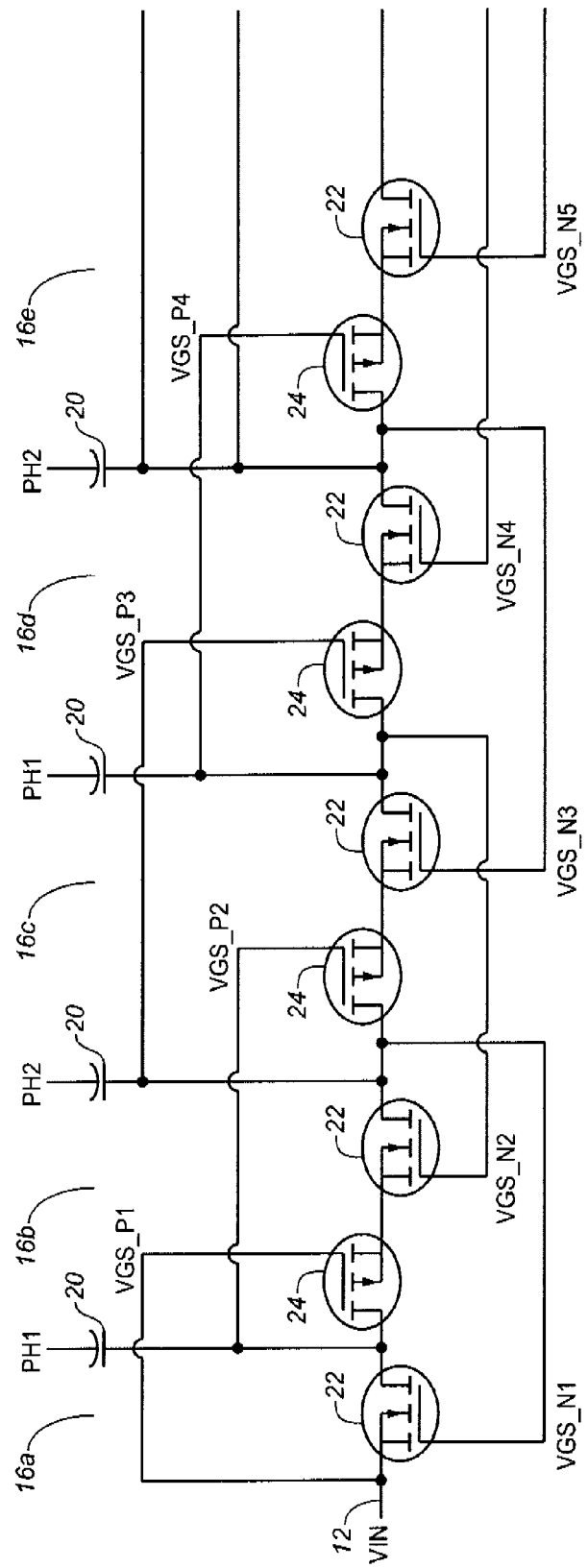

LOW-INPUT-VOLTAGE CHARGE PUMP

CROSS-REFERENCE TO RELATED APPLICATION AND CLAIM OF PRIORITY

The present application is related to U.S. patent application Ser. No. 11/985,457, filed on Nov. 15, 2007, now U.S. Pat. No. 7,595,683 B1, issued on Aug. 29, 2009.

BACKGROUND

1. Field of Invention

The present invention relates to charge pumps, and more particularly, to a low-supply-voltage charge pump.

2. Description of Related Art

Charge pumps are used to generate a higher or greater magnitude voltage from a lower or lesser magnitude voltage. Charge pumps can be used, for example, in power converters, which are essential for many modern electronic devices. Power converters are typically implemented using one or more switching devices, such as transistors, which are turned on and off (or driven) to deliver power to the output of the converter.

For some power converters, there is a need to drive the switching devices even when the input supply (gate) voltage is close to threshold voltage of the switching devices. If the supply voltage is particularly low (e.g., 1V), charge pumps according to previous designs either fail to provide the requisite driving voltage due to pump-stage switch losses or alternately require complex structure. Furthermore, the problem of low input voltage is compounded when loading conditions increase current demand (i.e., heavy loads).

Moreover, in many applications the output voltage of a charge pump may be regulated to a fixed voltage; thus, the voltage across each pump stage is reduced (regulated) to a voltage less than the open-loop or unregulated value. As such, regulation reduces the individual pump-stage voltage available for gate drive.

SUMMARY

In one embodiment of the present invention, a charge pump of relatively simple design is provided which can generate sufficient drive voltage for a power switching device from a low-supply-voltage (e.g., 1V). In some embodiments, this charge pump performs better at lower input voltages when there are loading conditions (i.e., when the charge-pump output powers other circuit blocks such as amplifiers and LDO's).

According to an embodiment of the present invention, a charge pump system is provided. The charge pump system includes an input terminal at which an input voltage is received, an output terminal at which at an output voltage is provided, and N stages connected in cascade between the input terminal and the output terminal. Each of the N stages includes a first and second transistors and a first capacitor. The first transistor is connected at a node to the second transistor. The first transistor receives a respective first control signal and the second transistor receives a respective second control signal. The respective first and second control signals are operable to turn on and off the first and second transistors. The first capacitor is coupled at one end to the node between the first and second transistors, and coupled at another end to receive one of two non-overlapping phase signals. At one value for one of the two non-overlapping phase signals, the first capacitor of the stage is charged by a respective stage input voltage. At another value for one of the two non-overlapping phase signals, the first capacitor of the stage is discharged to provide a respective stage output voltage. For at least some of the N stages, the first control signal is provided from a subsequent stage and the second control signal is provided from a prior stage. The charge pump system is capable of generating the output voltage with a greater magnitude than the input voltage even when the supply voltage is below 1V.

According to another embodiment of the present invention, a charge pump system is provided. The charge pump system includes an input terminal at which an input voltage is received, an output terminal at which at an output voltage is provided, and first through Nth stages connected in cascade between the input terminal and the output terminal. Each of the first through Nth stages comprises a first transistor, a second transistor, and a first capacitor. The first transistor is connected at a node to a second transistor. The first transistor receives a respective first control signal, and the second transistor receives a respective second control signal. The respective first and second control signals are operable to turn on and off the first and second transistors. The first capacitor is coupled at one end to the node between the first and second transistors, and coupled at another end to receive one of two non-overlapping phase signals. At one value for one of the two non-overlapping phase signals, the first capacitor of the stage is charged by a respective stage input voltage. At another value for one of the two non-overlapping phase signals, the first capacitor of the stage is discharged to provide a respective stage output voltage. For the first through (N−1)th stages, the first control signal is provided from a subsequent stage. For the second through Nth stages, the second control signal is provided from a subsequent stage. The charge pump system is capable of generating the output voltage with a greater magnitude than the input voltage even when the supply voltage is below 1V.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Figure 1B:
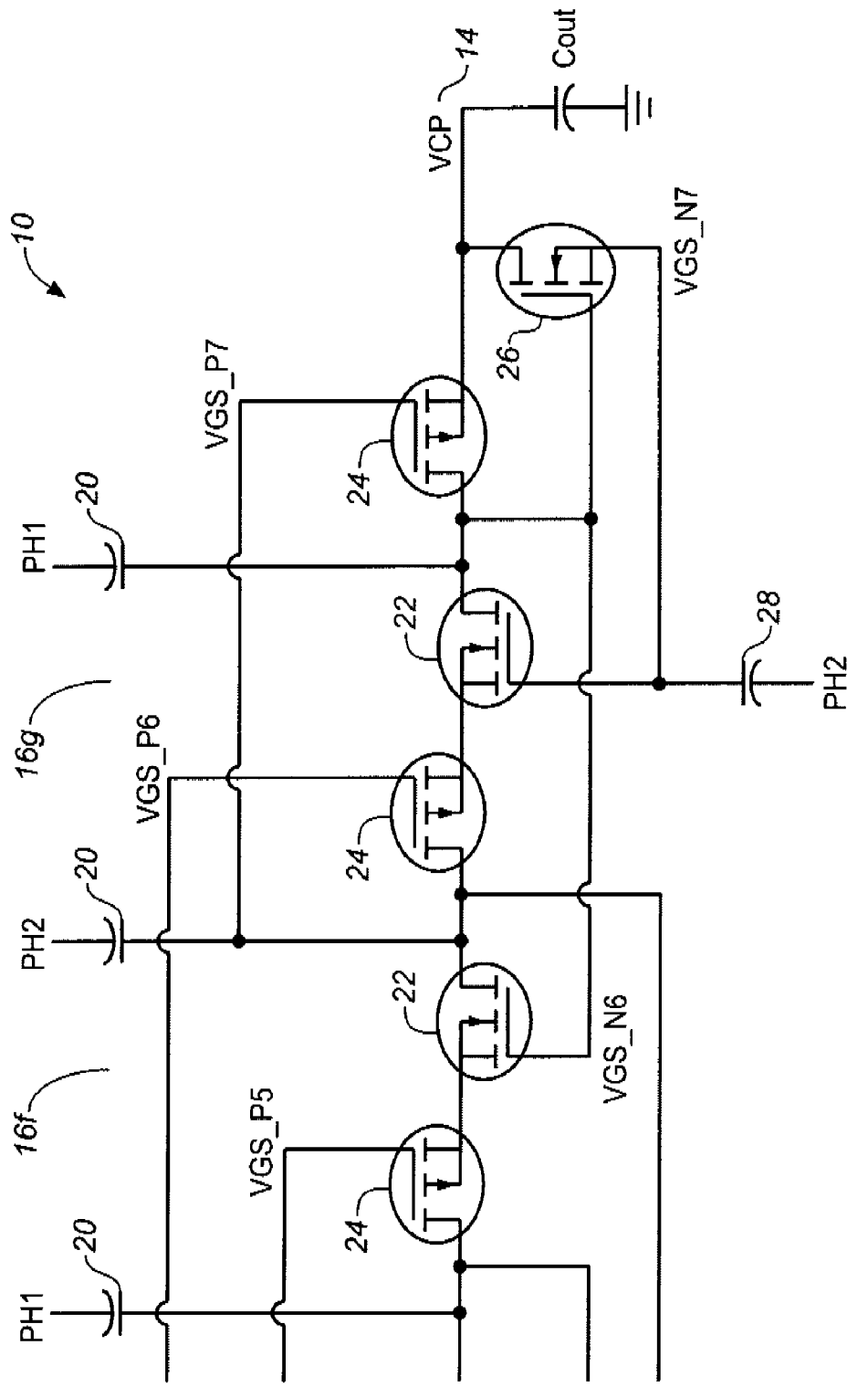
FIG. 1 is a schematic diagram of one implementation of a low-supply-voltage charge pump system, according to an embodiment of the invention.
Figure 5:
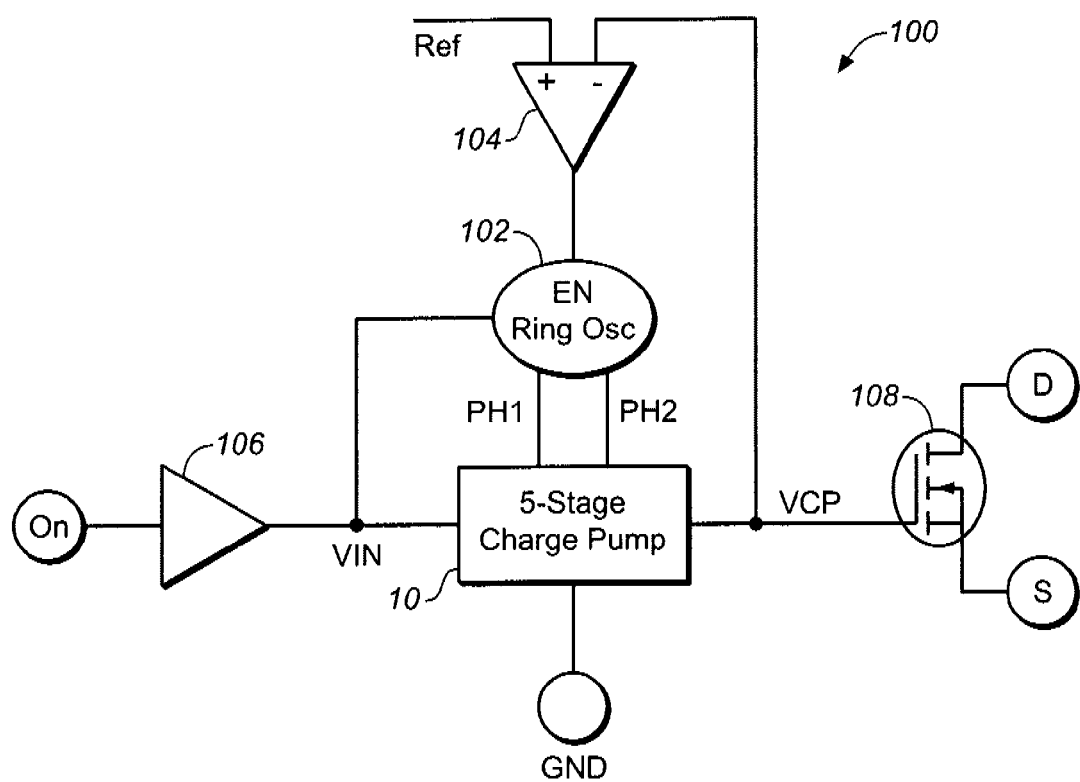
FIG. 5 is a schematic diagram in partial block form of an exemplary application for a low-supply-voltage charge pump system, according to an embodiment of the invention.

Embodiments of the present invention and their advantages are best understood by referring to FIGS. 1 and 5 of the drawings. Like numerals are used for like and corresponding parts of the various drawings.

In one embodiment of the present invention, a charge pump is provided which fundamentally generates a large voltage from a small voltage. The charge pump will pump to higher voltages even when the supply voltage is relatively low (e.g., 1V). Furthermore, this charge pump performs at lower input voltages even in the presence of (resistive) loading conditions. In contrast to previously developed charge pumps capable of generating large voltages from small supply voltages, the charge pump according to some embodiments of the invention is made up of cells or stages which are simpler in design. For example, in one embodiment, each stage of the charge pump can be implemented with two switching devices (e.g., transistors), unlike the previously developed charge pumps which require four or more switching devices for each stage. Thus, the charge pump according to embodiments of the present invention requires less circuitry to implement per pump stage compared to previous designs.

Moreover, embodiments of the present invention offer technical advantages in a regulated charge pump where each stage or cell sustains a fraction of the output voltage. Because the output voltage is limited (or regulated), each cell voltage is also limited. Hence, the available pump gate drive is limited. With embodiments of the present invention, the gate drive available in each stage is augmented, compared to that of the prior art, by using the voltage derived from a successive stage. This provides for better performance in the charge pump according to embodiments of the invention.

Charge pumps according to some embodiments of the present invention can be used in power converter applications, such as, for example, to provide driving gate voltages (e.g., regulated to a maximum Vgs of 6V) for power switches (e.g., power MOSFETs).

Charge pumps according to various embodiments can be designed to pump charge for both positive and negative output voltages.

FIG. 1 is a schematic diagram of one implementation of a low-supply-voltage charge pump system 10, according to an embodiment of the invention. Charge pump system 10 is a positive charge pump. It receives an input voltage (VIN) at an input terminal 12, and delivers an output voltage (VCP_OUT) of greater magnitude at an output terminal 14. Charge pump system 10 is capable of operating even when the supply, which determines the magnitude of PH1 and PH2 signals, is a relatively small amount (e.g., less than 1V). Charge pump system 10 receives control or phase signals PH1 and PH2. Phase signals PH1 and PH2 are non-overlapping clock signals which typically are symmetric square waves with maximum amplitude equal to the supply voltage and minimum amplitude equal to ground (0V). Input voltage VIN can have a value (in some embodiments, fixed) between 0V and the supply voltage (maximum magnitude of PH1 and PH2).

Charge pump system 10 has multiple or "N" number of stages 16 (separately labeled 16a, 16b, 16c, 16d, 16e, 16f, and 16g) coupled between input terminal 12 and output terminal 14. As used herein, the terms "coupled" or "connected," or any variant thereof, covers any coupling or connection, either direct or indirect, between two or more elements. Each stage 16 (generally an "nth" stage) functions to generate an output voltage with magnitude greater than its respective input voltage. The stages 16a-16g are connected in cascade, with the output of one stage being provided as the input to the next stage. The charge pumping stages 16a-16g can also be referenced by their respective positions in the cascade. Stage 16a is the first stage; stage 16b is the second stage; stage 16c is the third stage; and so on, with stage 16g being the Nth or final stage. The stages 16a-16g can be viewed as two groups: odd-numbered stages 16a, etc. (or the first, third, and fifth stages); and even-numbered stages 16b, etc. (or the second, fourth, and sixth stages). Each of the odd-numbered stages (first stage, third stage, and so forth) receives phase signal PH1, while each of the even-numbered stages (second stage, fourth stage, and so forth) receives phase signal PH2.

In one embodiment, the first charge pump stage 16a through the (N−1)th charge pump stage 16f can each be implemented in the same way. As shown, the first through (N−1)th stage—i.e., stages 16a-16f—are each implemented with a capacitor 20 and two transistors (e.g., MOSFETs) 22 and 24. Each capacitor 20 stores or releases charge. In this embodiment, transistor 22 is an N-channel MOSFET, and transistor 24 is a P-channel MOSFET. The transistor 22 in each stage 16a-16f is turned on and off by a respective control signal (e.g., VGS_N1, VGS_N2, VGS_N3, VGS_N4, VGS_N5, VGS_N6) which is provided from the immediately following stage; the transistor 24 in each stage 16a-16f is turned on and off by a respective control signal (e.g., VGS_P1, VGS_P2, VGS_P3, VGS_P4, VGS_P5, VGS_P6) which is provided from the immediately preceding stage (or in the case of the first stage 16a, the input voltage VIN). In other words, each nth-stage is configured to use the n+1(th)-stage connected-drain signal to drive the nth-stage N-channel MOSFET 22; and, each nth-stage is configured to use the n−1(th)-stage connected-drain signal to drive the nth-stage P-channel MOSFET 24. When a transistor is turned on it conducts current in a manner to allow the transfer of charge. When a transistor is turned off, it blocks current. One end of the capacitor 20 of each stage 16a-16f is coupled to the junction of the transistors 22 and 24, and the other end of the capacitor is coupled to receive the phase signal (PH1 or PH2) for the respective stage. Each stage 16a-16f receives its input voltage at transistor 22 and provides its output voltage at transistor 24. For the second through (N−1)th stages—i.e., stages 16b-16f—a control signal (for the immediately following stage) is provided from the junction at which capacitor 20 and transistors 22 and 24 are coupled. For each stage 16a-16g, when transistor 22 is turned on, the capacitor 20 is charged by the input to the stage through transistor 22. Alternately, when transistor 22 is turned off, the voltage (or equivalently the charge) on capacitor 20 is delivered out to the next stage through transistor 24.

The last or Nth stage 16g of charge pump system 10 can be implemented in a different way from the first through (N−1)th stages. As shown, the Nth stage 16g is implemented with a capacitor 20 and transistors 22, 24, similar to the first through (N−1)th stages 16a-16f. The transistor 24 and capacitor 20 of the Nth stage 16g are coupled in the same arrangement and operate in the same manner as transistors 24 and capacitors 20 of the other stages 16a-16f in the charge pump system 10. In addition, Nth stage 16g includes another transistor 26 (e.g., MOSFET) and another capacitor 28. One end of capacitor 28 is coupled to the control terminal (gate) of transistor 22 in the Nth stage 16g, and the other end of the capacitor 28 is coupled to receive the phase signal PH1 or PH2, depending on the total number of stages in the charge pump system 10. As shown, capacitor 28 is coupled to receive phase signal PH2. Transistor 26 and capacitor 28 provide the control signal for the transistor 22 of the Nth stage. Transistor 26 combined with pump capacitor 28 provide a final terminating stage for the charge pump system 10. When phase signal PH2 is low, transistor 26 allows charge from VCP_OUT to flow to capacitor 28. When phase signal PH2 transitions high, the charge (voltage) on capacitor 28 provides the requisite drive voltage at the transistor 22 of the Nth stage.

Figure 2A:
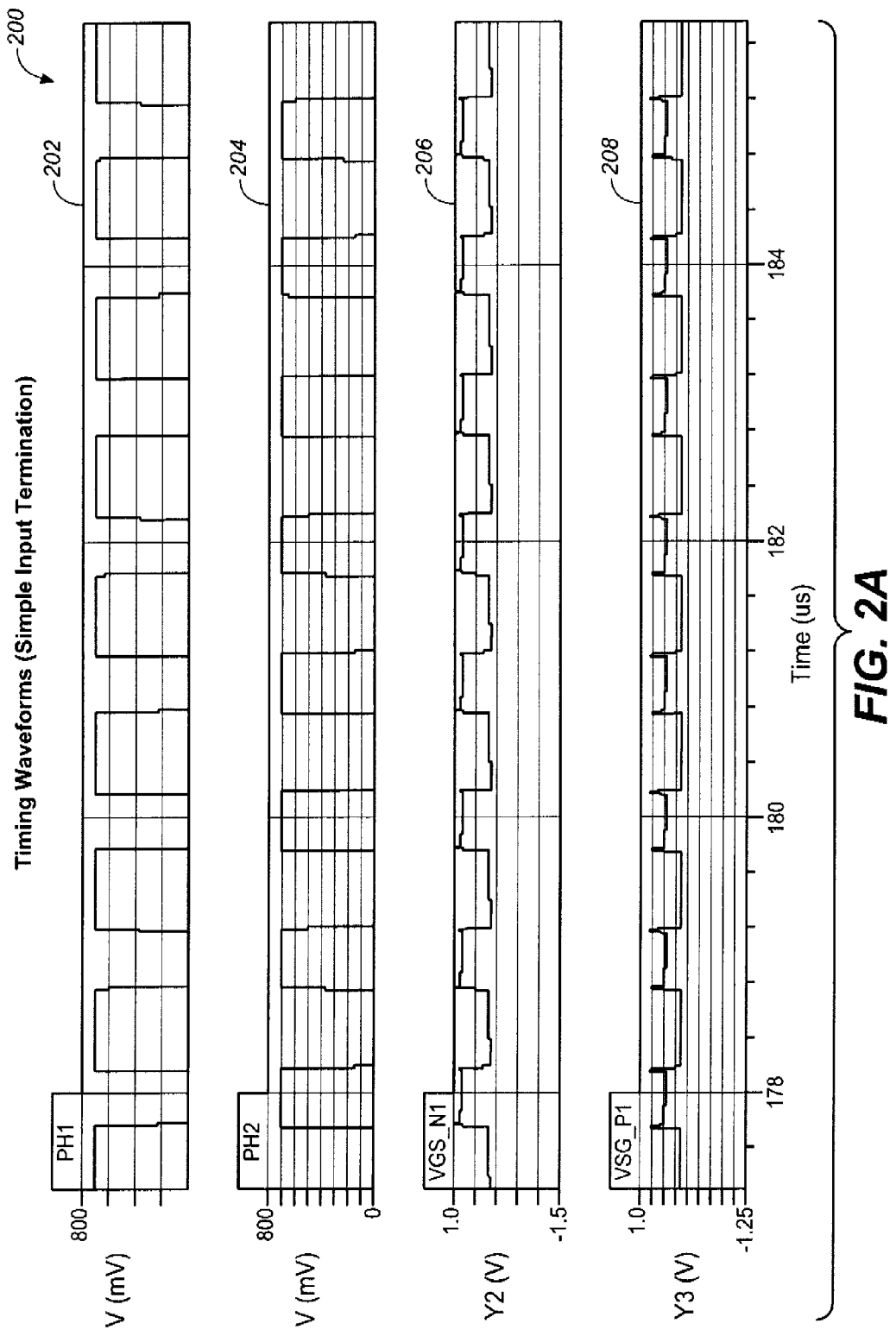
FIG. 2 is an exemplary waveform diagram for control signals and the output of the charge pump system illustrated in FIG. 1, according to an embodiment of the invention.
Figure 2B:
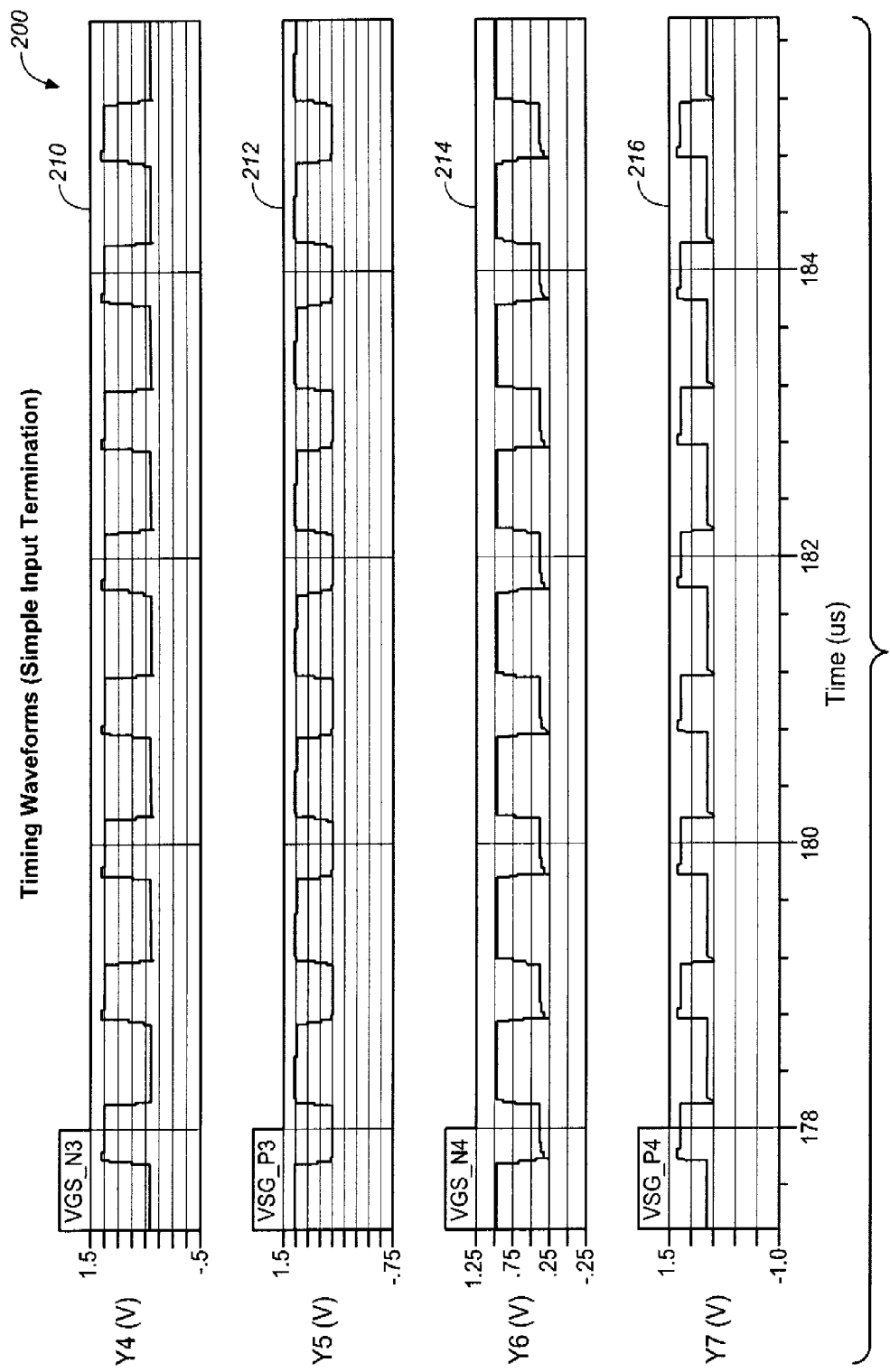

FIG. 2 is an exemplary waveform diagram 200 for control signals of the charge pump system 10 illustrated in FIG. 1, according to an embodiment of the invention. As shown, FIG. 2 includes waveforms 202, 204, 206, 208, 210, 212, 214, and 216, for signals PH1, PH2, VGS_N1, VGS_P1, VGS_N2, VGS_P2, VGS_N3, and VGS_P3 for the first three stages of charge pump system 10.

In operation, with reference to FIGS. 1 and 2, on application of the phase signals PH1 and PH2, the stages 16a through 16g of charge pump system 10 generate increasingly higher voltage values in the cascade. That is, the first charge pump stage 16a generates a first output voltage which is greater in magnitude than VIN; the second charge pump stage 16b generates a second output voltage which is greater in magnitude than the first output voltage from the first stage 16a; the third stage generates a third output voltage which is greater in magnitude than the second output voltage from the second stage 16b; and so forth. The last or Nth stage 16g in charge pump system 10 generates the output voltage VCP_OUT.

More specifically, in steady-state operation, when phase signal PH1 is low (and phase signal PH2 is high), for each of the odd-numbered stages (e.g., first stage 16a, third stage, fifth stage, etc.), the respective control signal (e.g., VGS_N1, VGS_N3, VGS_N5, etc.) from the respective subsequent stage (e.g., second stage 16b, fourth stage, sixth stage, etc.) turns on transistor 22 in the odd-numbered stage, thus allowing the input voltage from the prior stage (or VIN in the case of the first stage) to charge its capacitor 20. Capacitor 20 of each odd-numbered stage charges to the voltage output from the prior even-numbered stage. For each of the even-numbered stages (e.g., second stage 16b, fourth stage, sixth stage, etc.), the respective control signal (e.g., VGS_N2, VGS_N4, VGS_N6, etc.) from the respective subsequent stage (e.g., third stage 16b, fifth stage, seventh stage, etc.) turns off transistor 22, thus blocking the flow of current to a prior stage. The respective control signal (e.g., VGS_P2, VGS_P4, VGS_P6, etc.) from the respective prior stage (e.g., first stage 16a, third stage, fifth stage, etc.) turns on transistor 24, thus allowing the capacitor 20 to discharge, and the sum of the voltage on capacitor 20 and the magnitude of the phase signal PH2 is delivered (to the next stage) through transistor 24 of the even-numbered stage and transistor 22 of the subsequent odd-numbered stage.

When phase signal PH1 next goes high (and phase signal PH2 goes low), the respective control signal (e.g., VGS_N1, VGS_N3, VGS_N5, etc.) turns transistor 22 off in each of the odd-numbered stages (e.g., first stage 16a, third stage, fifth stage, etc.), thereby blocking the flow of current to a prior stage. The respective control signal (e.g., VGS_P1, VGS_P3, VGS_P5, etc.) from the respective prior stage turns on transistor 24 to allow capacitor 20 to discharge, and the sum of the voltage on capacitor 20 and the magnitude of the phase signal PH1 is delivered (to the subsequent even-numbered stage) through transistor 24 of the present odd-numbered stage and transistor 22 of the subsequent even-numbered stage. For each of the even-numbered stages (e.g., second stage 16b, fourth stage, sixth stage, etc.), the respective control signal (e.g., VGS_N2, VGS_N4, VGS_N6, etc.) from the respective subsequent stage (e.g., third stage, fifth stage, seventh stage, etc.) turns on transistor 22 in the even-numbered stage, thus allowing the input voltage from the prior odd-numbered stage to charge the capacitor 20 of the present even-numbered stage.

At the last or Nth stage 16g of the charge pump system 10, when the phase signal PH1 is high (and phase signal PH2 is low), transistor 26 is turned off, and the control signal (from capacitor 28) turns transistor 22 on in the Nth stage 16g, thus allowing the output voltage from the (N−1)th stage 16f to charge the capacitor 20 of the Nth stage 16g. Capacitor 20 of the Nth stage 16g charges to a higher voltage than any other stage in system 10. Transistor 22 of the Nth stage 16g is turned off by the control signal. When phase signal PH2 goes high (and phase signal PH1 goes low), transistor 26 is turned on, and the control signal turns transistor 22 off. Transistor 24 is turned on by control signal VGS_P7 from the (N−1)th stage 16f. This allows capacitor 20 to discharge, and the sum of the voltage on capacitor 20 in the Nth stage 16f and the magnitude of the phase signal PH2 are passed through transistor 24 as the output voltage VCP_OUT of the charge pump system. This output voltage also charges capacitor 28.

Thus, in the manner described above, charge is transferred from left to right in charge pump system 10 (from VIN to VCP_OUT).

Because the capacitor 20 in each stage is charged to a greater magnitude than that to which the capacitor 20 in the prior stage is charged, a higher voltage is output from each subsequent stage in the charge pump system 10.

A technical advantage of charge pump system 10 is that each stage is implemented with only two switching devices (e.g., transistors), as compared to prior designs for charge pumps capable of working on relatively low input (supply) voltage, such as 1V or slightly lower. In particular, with such prior designs, at least four transistors are required to implement each stage. Accordingly, charge pump system 10 is simpler and requires less physical space to implement.

Another technical advantage of charge pump system 10 is that the transistors 22, 24 in each of the intermediate stages (i.e., second through (N−1)th stage) is driven with a control signal having a greater magnitude than that of previous designs. This provides better performance at each stage, and thus better overall performance for charge pump system 10.

Furthermore, as compared to some previous designs for charge pumps, this implementation for charge pump system 10 improves P-channel conduction for achieving lower voltage operation.

Moreover, this new approach of charge pump system 10 allows reduced switching loss when the input is relatively low (e.g., VIN<1V).

Yet another technical advantage of charge pump system 10 is that each stage can be self-clamping because the N-channel and P-channel devices (i.e., transistors 22 and 24) are forward-biased with respect to the charge-pump rail. Therefore, as the input-voltage level increases, the charge pump will reach a level which causes the N-stage array to forward bias; beyond this input-voltage level, the charge-pump voltage is clamped.

In some embodiments, the output voltage of the charge pump system 10 can be regulated, for example, to a particular voltage value. In other embodiments, the output voltage of the charge pump system 10 can be unregulated.

In some embodiments, all or a portion of charge pump system 10 can be implemented as discrete components, or on a single or multiple semiconductor dies (commonly referred to as a "chip") either alone or along with other circuitry, such as, for example, flash memory. Each die is a monolithic structure formed from, for example, silicon or other suitable material. For implementations using multiple dies or components, the dies and components can be assembled on a printed circuit board (PCB) having various traces for conveying signals there between.

Thus, when phase signal PH1 is high (and phase signal PH2 is low), each of the odd-numbered stages 16a, 16b, and 16c outputs a voltage which charges the capacitor 20 in the respective following even-numbered stages (stages 2, 4, 6, etc., or blocks 18, 22, 26, 30). Alternately, when phase signal PH2 is high (and phase signal PH1 is low), each of the even-numbered stages (stages 2, 4, 6, etc., or blocks 18, 22, 26, 30) outputs a voltage which charges the capacitor 20 in the respective following odd-numbered stages (stages 3, 5, etc., or blocks 20, 24, 28, 30).

Each stage is configured to use the n+1(th)-stage connected-drain signal to drive the control terminal (gate) of nth-stage N-channel transistor. Furthermore, each stage is configured to use the n−1(th)-stage connected-drain signal to drive the control terminal (gate) of the nth-stage P-channel. This gives superior drive to the P-channel transistors. In addition, embodiments of the charge pump system, according to embodiments of the present invention, require fewer transistors than standard prior art designs.

Figure 3A:
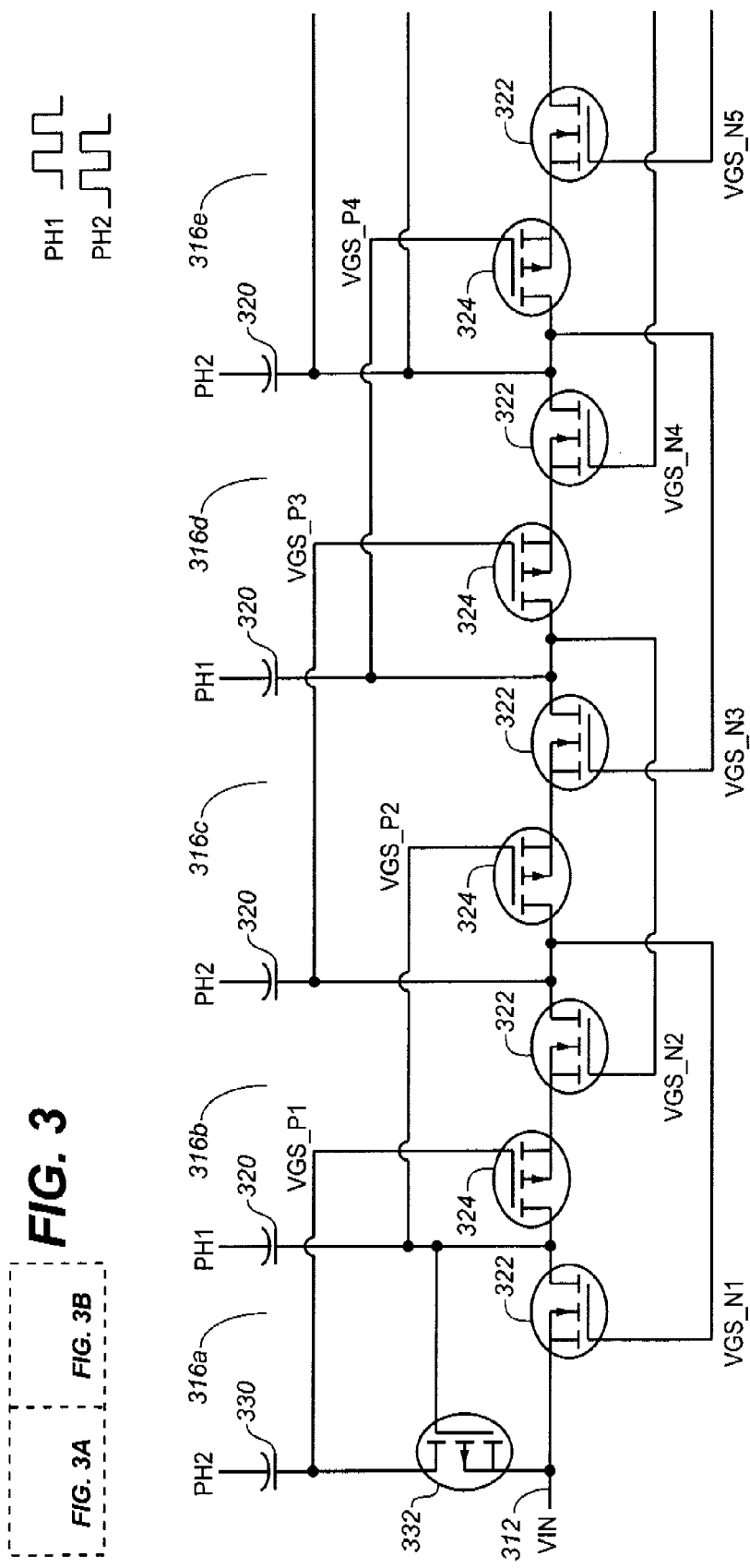
FIG. 3 is a schematic diagram of another implementation of a low-supply-voltage charge pump system, according to an embodiment of the invention.
Figure 3B:
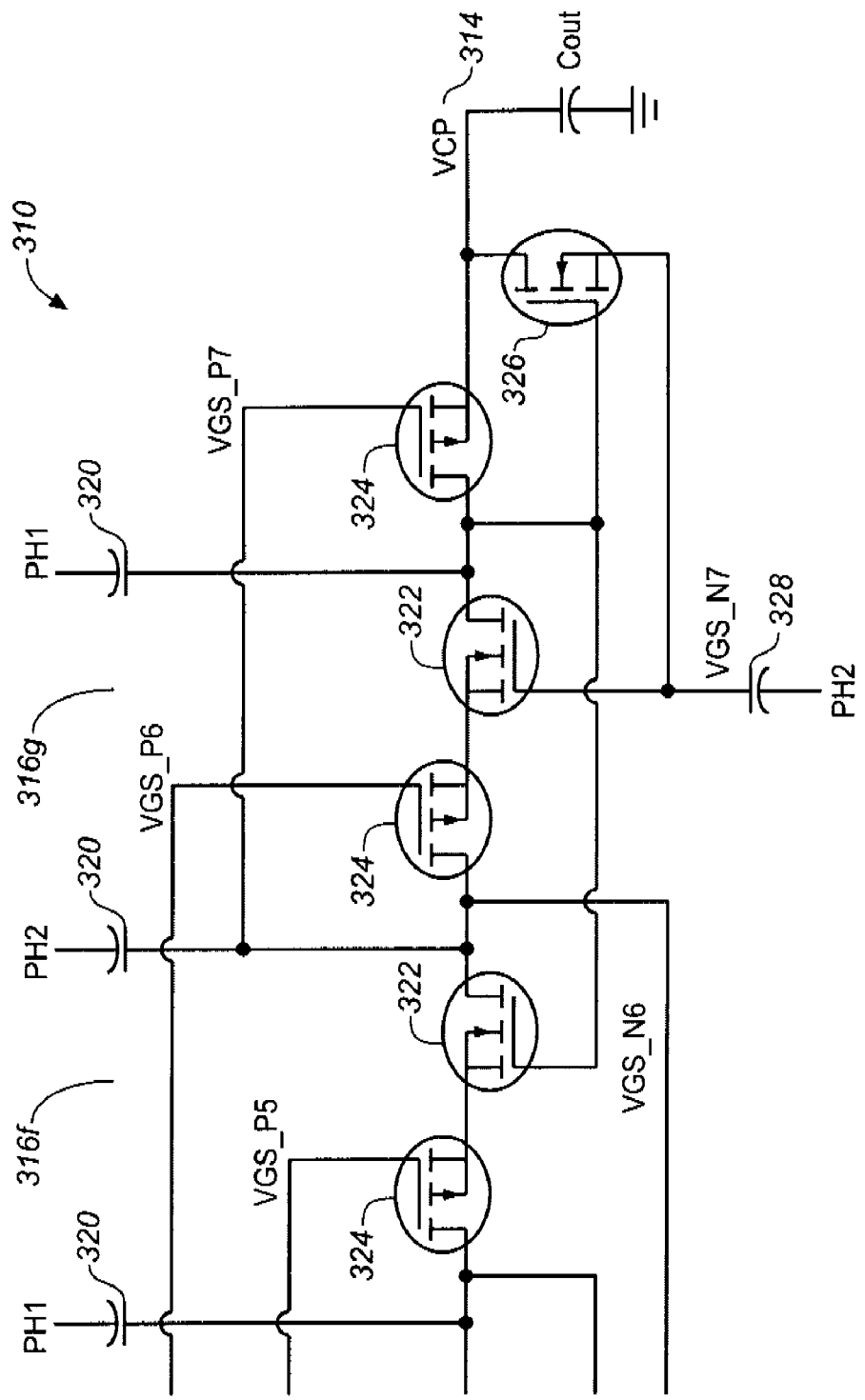

FIG. 3 is a schematic diagram of another implementation of a low-supply-voltage charge pump system 310, according to an embodiment of the invention. Charge pump system 310 is a positive charge pump. It receives an input voltage (VIN) at an input terminal 312, and delivers an output voltage (VCP_OUT) of greater magnitude at an output terminal 314. Charge pump system 310 is capable of operating even when the supply, which determines the magnitude of PH1 and PH2 signals, is a relatively small amount (e.g., less than 1V). Charge pump system 310 receives control or phase signals PH1 and P112. Phase signals PH1 and PH2 are non-overlapping clock signals which typically are symmetric square waves with maximum amplitude equal to the supply voltage and minimum amplitude equal to ground (0V). Input voltage VIN can have a value (in some embodiments, fixed) between 0V and the supply voltage (maximum magnitude of PH1 and PH2).

Charge pump system 310 of FIG. 3 is substantially similar to charge pump system 10 of FIG. 1. Like system 10, charge pump system 310 has multiple stages 316 (separately labeled 316a, 316b, 316c, 316d, 316e, 316f, and 316g) coupled between input terminal 312 and output terminal 314. Each stage 316 functions to generate an output voltage with magnitude greater than its respective input voltage. The stages 316a-316g are connected in cascade, with the output of one stage being provided as the input to the next stage. The charge pumping stages 316a-316g can also be referenced by their respective positions in the cascade.

In one embodiment, the second charge pump stage 316b through the next to last charge pump stage 316f can each be implemented in the same way. As shown, the first through (N−1)th stage—i.e., stages 316b-316f—are each implemented with a capacitor 320 and two transistors (e.g., MOSFETs) 322 and 324. Each capacitor 320 stores or releases charge. In this embodiment, transistor 322 is an N-channel MOSFET, and transistor 324 is a P-channel MOSFET. The transistor 322 in each stage 316b-16f is turned on and off by a respective control signal (e.g., VGS_N2, VGS_N3, VGS_N4, VGS_N5, VGS_N6) which is provided from the immediately following stage; the transistor 24 in each stage 16b-16f is turned on and off by a respective control signal (e.g., VGS_P2, VGS_P3, VGS_P4, VGS_P5, VGS_P6) which is provided from the immediately preceding stage (or in the case of the first stage 316a, the input voltage VIN). In other words, each nth-stage is configured to use the n+1(th)-stage connected-drain signal to drive the nth-stage N-channel MOSFET 322; and, each nth-stage is configured to use the n−1(th)-stage connected-drain signal to drive the nth-stage P-channel MOSFET 324.

Also, like system 10, the last or Nth stage 316g of charge pump system 310 can be implemented in a different way from the first through (N−1)th stages. As shown, the Nth stage 316g is implemented with a capacitor 320 and transistors 322, 324, similar to the second through (N−1)th stages 316b-316f. The transistor 324 and capacitor 320 of the Nth stage 316g are coupled in the same arrangement and operate in the same manner as capacitors 324 of the other stages 316b-316f in the charge pump system 310. In addition, Nth stage 316g includes another transistor 326 (e.g., MOSFET) and another capacitor 328. One end of capacitor 328 is coupled to the control terminal (gate) of transistor 322 in the Nth stage 316g, and the other end of the capacitor 328 is coupled to receive the phase signal PH1 or PH2, depending on the total number of stages in the charge pump system 310. As shown, capacitor 328 is coupled to receive phase signal PH2. Transistor 326 and capacitor 328 provide the control signal for the transistor 322 of the Nth stage. Transistor 326 combined with pump capacitor 328 provide a final terminating stage for the charge pump system 10. When phase signal PH2 is low, transistor 326 allows charge from VCP_OUT to flow to capacitor 328. When phase signal PH2 transitions high, the charge (voltage) on capacitor 328 provides the requisite drive voltage at the transistor 322 of the Nth stage.

Charge pump system 310 of FIG. 3 uses a different configuration for the first stage 316a compared to that of charge pump system 10 of FIG. 1. First stage 316a of system 310 includes a capacitor 320 and transistors 322, 324, similar to the second through) N−1)th stages 316b-316f. First stage 316a also another capacitor 330 and another transistor 332. One end of capacitor 330 is coupled to the control terminal (gate) of transistor 324 in the first stage 316a, and the other end of the capacitor 330 is coupled to receive the phase signal PH2 (in this embodiment). Transistor 332 and capacitor 330 provide the control signal for the transistor 324 of the first stage, thus providing more optimal drive for transistor 324 (as compared to the first stage 16 of system 10). When phase signal PH2 is low, transistor 332 allows charge from VIN to flow to capacitor 330. When phase signal PH2 transitions high, the charge (voltage) on capacitor 330 provides the requisite (blocking) drive voltage at the transistor 324 of the first stage.

Figure 4A:
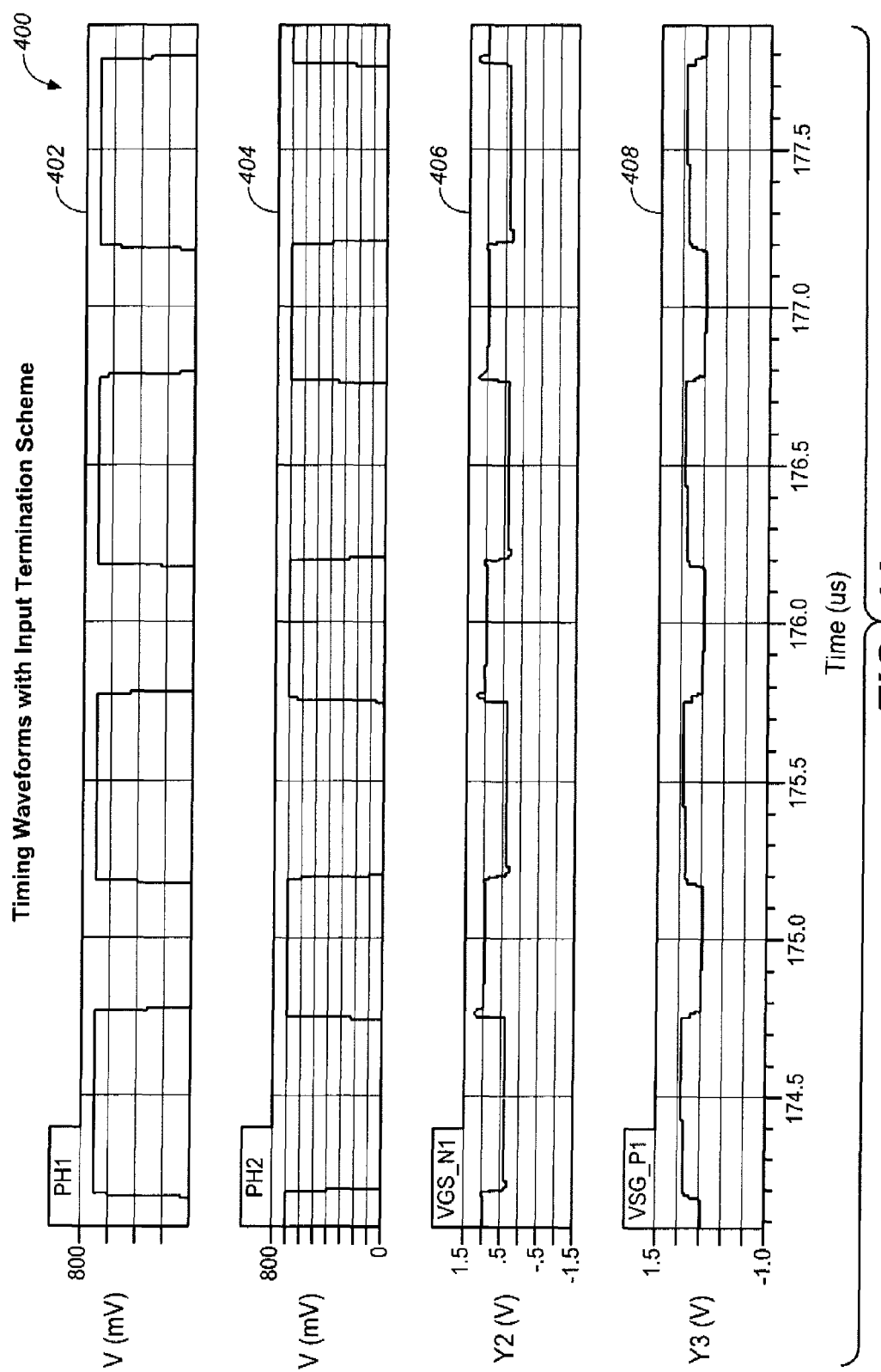
FIG. 4 is an exemplary waveform diagram for control signals and the output of the charge pump system illustrated in FIG. 3, according to an embodiment of the invention.
Figure 4B:
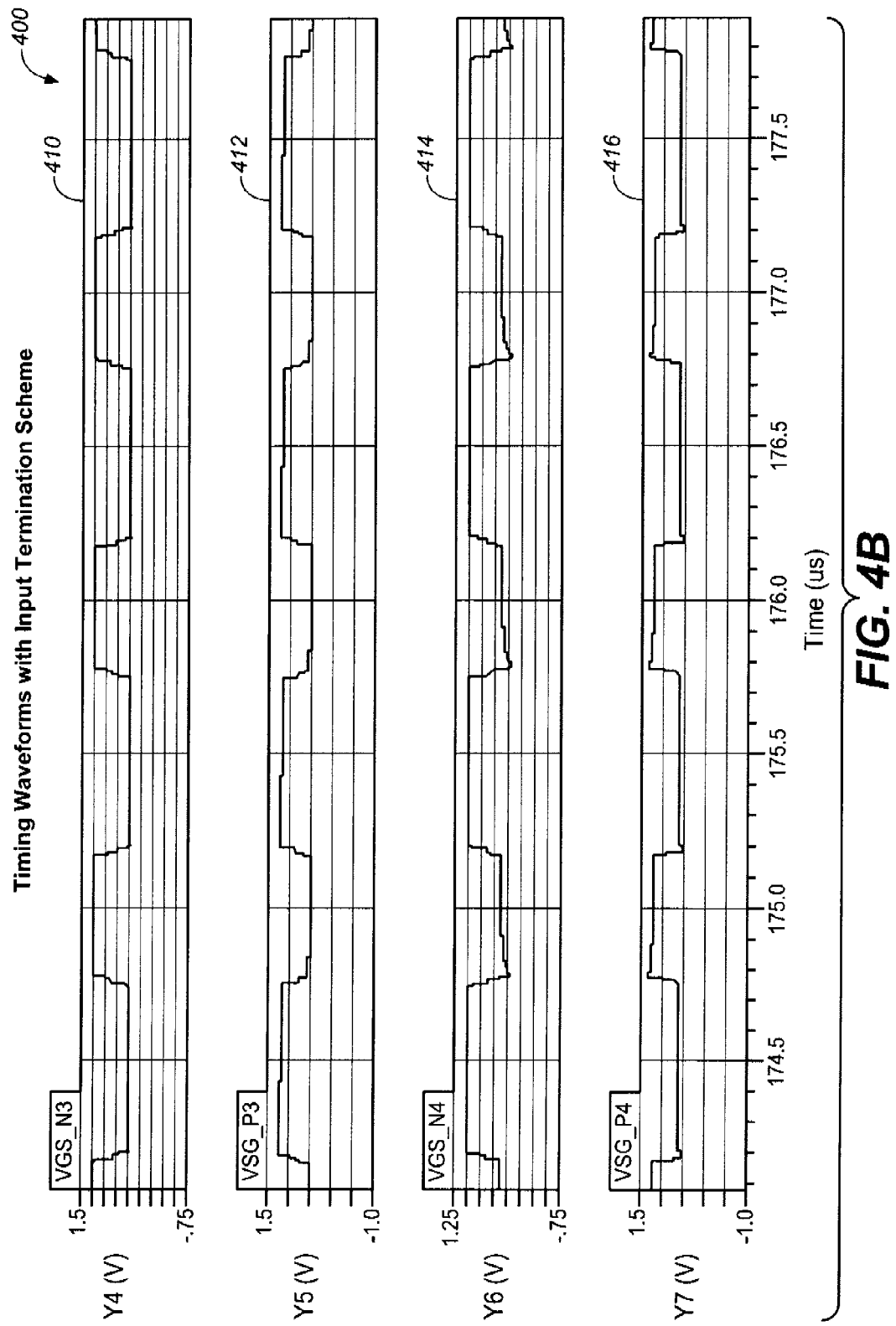

FIG. 4 is an exemplary waveform diagram 400 for control signals of the charge pump system 310 illustrated in FIG. 3, according to an embodiment of the invention. As shown, FIG. 4 includes waveforms 402, 404, 406, 408, 410, 412, 414, and 416, for signals PH1, PH2, VGS_N1, VGS_P1, VGS_N2, VGS_P2, VGS_N3, and VGS_P3 for the first three stages of charge pump system 310.

Charge pump system 310 of FIG. 3 operates in a similar manner and has the same advantages as system 10 of FIG. 1.

In one application, charge pump system 10 (or 310) can be used in a power converter system, for example, to drive a power switching device (e.g., power MOSFET). The output voltage VCP_OUT is applied to the control terminal (e.g., gate) of the power switching device to assure good conduction of the switching device.

FIG. 5 is a schematic diagram in partial block form of an exemplary application for a low-supply-voltage charge pump system, according to an embodiment of the invention. FIG. 5 shows a load switch system 100 utilizing a charge pump system 10. The load switch system 100 also includes an oscillator 102, a comparator 104, an inverter gate 106, and a switching device 108. The charge pump system 10, which in this embodiment has five stages, receives a VIN signal and outputs the VCP (or VCP_OUT) signal. The VCP signal drives the gate of the switching device 108, which can be, for example, a power MOSFET. Comparator 104 compares VCP against a reference voltage and outputs a signal in response. The oscillator 102, which can be a ring oscillator, is enabled by the signal output from comparator 104. The comparator 104 generates the phase signals PH1 and PH2, which are provided to the charge pump system 10 (or 310).

In another application, charge pump system 10 can be used in a flash memory to provide higher voltage levels.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A charge pump system comprising:
    an input terminal at which an input voltage is received;
    an output terminal at which at an output voltage is provided;
    N stages connected in cascade between the input terminal and the output terminal,
    wherein each of the N stages comprises:
        a first transistor connected at a node to a second transistor, wherein the first transistor receives a respective first control signal and the second transistor receives a respective second control signal, wherein the respective first and second control signals are operable to turn on and off the first and second transistors;
        a first capacitor coupled at one end to the node between the first and second transistors, the first capacitor coupled at another end to receive one of two non-overlapping phase signals; and
        wherein at one value for one of the two non-overlapping phase signals the first capacitor of the stage is charged by a respective stage input voltage, and wherein at another value for one of the two non-overlapping phase signals the first capacitor of the stage is discharged to provide a respective stage output voltage; and
    wherein for at least some of the N stages, the first control signal is provided from a subsequent stag; and wherein for each of the second through the N-th stages, the second control signal is provided from a prior stage of the charge pump system;
    wherein the charge pump system is capable of generating the output voltage with a greater magnitude than the input voltage even when the supply voltage is below 1V.

2. The charge pump system of claim 1 wherein the system is a positive charge pump system.

3. The charge pump system of claim 1 wherein each of the first through the (N−1)th stages receives a control signal from a subsequent stage in the charge pump system.

4. The charge pump system of claim 1 wherein the system is designed to pump charge for a negative output voltage.

5. The charge pump system of claim 1 wherein the first stage comprises:
    a third capacitor coupled at one end to a control terminal for one of the first and second transistors in the first stage, the third capacitor coupled at another end to receive one of two non-overlapping phase signals; and
    a fourth transistor connected to the third capacitor, wherein the fourth transistor receives a respective fourth control signal from the node between the first and second transistors of the first stage.

6. The charge pump system of claim 1 wherein the output voltage is regulated.

7. The charge pump system of claim 1 wherein the output voltage is unregulated.

8. The charge pump system of claim 1 wherein one of the first and the last of the N stages includes a third transistor coupled to the node between the first and second transistors, and a second capacitor coupled to the third transistor.

9. The charge pump system of claim 8 wherein at one value for the one of two non-overlapping phase signals a voltage on the second capacitor and a voltage of one of two non-overlapping phase signals is provided through the third transistor as the output voltage of the charge pump system.

10. The charge pump system of claim 1 wherein progressively larger stage output voltages are provided from each of the first through the (N−1)th stages to the next respective stage in the charge pump system.

11. The charge pump system of claim 1 wherein the last stage comprises:
    a second capacitor coupled at one end to a control terminal for one of the first and second transistors in the last stage, the first capacitor coupled at another end to receive one of two non-overlapping phase signals; and
    a third transistor connected to the second capacitor, wherein the third transistor receives a respective third control signal from the node between the first and second transistors of the last stage.

12. A charge pump system comprising:
    an input terminal at which an input voltage is received;
    an output terminal at which at an output voltage is provided;
    first through Nth stages connected in cascade between the input terminal and the output terminal,
    wherein each of the first through Nth stages comprises:
        a first transistor connected at a node to a second transistor, wherein the first transistor receives a respective first control signal and the second transistor receives a respective second control signal, wherein the respective first and second control signals are operable to turn on and off the first and second transistors;
        a first capacitor coupled at one end to the node between the first and second transistors, the first capacitor coupled at another end to receive one of two non-overlapping phase signals; and
        wherein at one value for one of the two non-overlapping phase signals the first capacitor of the stage is charged by a respective stage input voltage, and wherein at another value for one of the two non-overlapping phase signals the first capacitor of the stage is discharged to provide a respective stage output voltage; and
    wherein for the first through (N−1)th stages, the first control signal is provided from a subsequent stage;
    wherein for the second through Nth stages, the second control signal is provided from a preceding stage;
    wherein the charge pump system is capable of generating the output voltage with a greater magnitude than the input voltage even when the supply voltage is below 1V.

13. The charge pump system of claim 12 wherein the system is a positive charge pump system.

14. The charge pump system of claim 12 wherein the system is designed to pump charge for a negative output voltage.

15. The charge pump system of claim 12 wherein the output voltage is regulated.

16. The charge pump system of claim 12 wherein the output voltage is unregulated.

17. The charge pump system of claim 12 wherein progressively larger stage output voltages are provided from each of the first through the (N−1)th stages to the next respective stage in the charge pump system.

18. The charge pump system of claim 12 wherein the last stage comprises:

a second capacitor coupled at one end to a control terminal for one of the first and second transistors in the last stage, the first capacitor coupled at another end to receive one of two non-overlapping phase signals; and a third transistor connected to the second capacitor, wherein the third transistor receives a respective third control signal from the node between the first and second transistors of the last stage.

19. The charge pump system of claim 12 wherein the first stage comprises:

a third capacitor coupled at one end to a control terminal for one of the first and second transistors in the first stage, the third capacitor coupled at another end to receive one of two non-overlapping phase signals; and a fourth transistor connected to the third capacitor, wherein the fourth transistor receives a respective fourth control signal from the node between the first and second transistors of the first stage.

* * * * *